United States Patent Office 3,364,198
Patented Jan. 16, 1968

3,364,198
PROCESS FOR THE PRODUCTION OF N⁶-METH-YLTUBERCIDIN AND INTERMEDIATE
Paul F. Wiley, Texas Township, Kalamazoo County, Mich., assignor to The Upjohn Company, Kalamazoo, Mich., a corporation of Delaware
No Drawing. Continuation of application Ser. No. 403,375, Oct. 12, 1964. This application Apr. 2, 1965, Ser. No. 445,244
2 Claims. (Cl. 260—211.5)

This application is a continuation of application Ser. No. 403,375, filed Oct. 12, 1964, and now abandoned.

This invention relates to a novel organic compound and is particularly concerned with the novel N⁶-methyltubercidin (4-methylamino - 7 - β - D-ribofuranosyl-7H-pyrrolo[2,3-d]pyrimidine) and a process for the production thereof.

The novel compound and the process for the production thereof can be illustratively shown by the following sequence of formulae:

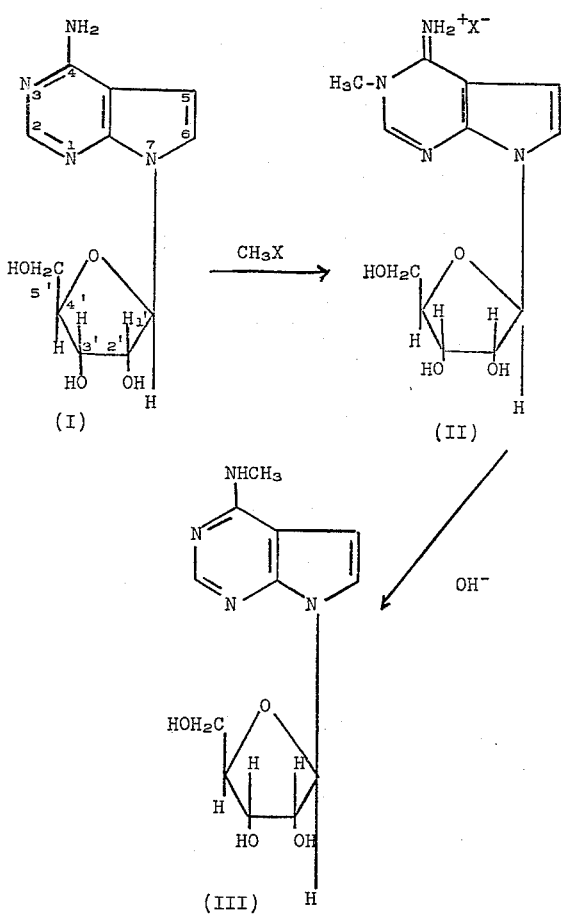

wherein X is selected from the group consisting of bromine, iodine, monomethylsulfate and p-toluenesulfonate (and X⁻ signifies, of course, the corresponding anion, i.e., bromide, iodide, monomethylsulfate and p-toluenesulfonate).

The process of this invention comprises:
(1) Treating tubercidin, also referred to as sparsomycin A or 4-amino-7-β-D-ribofuranosyl-7H-pyrrolo-[2,3-d] pyrimidine, with a methylating agent selected from the group consisting of methyl bromide, methyl iodide, dimethylsulfate and methyl toluenesulfonate, in a solution of an N,N-dialkylamide, such as dimethylformamide, dimethylacetamide, and the like to obtain the corresponding N¹-methyltubercidin salt (II);
(2) Heating compound II with an aqueous solution of an alkali-metal or alkaline earth hydroxide to give N⁶-methyltubercidin (III).

The novel compound N⁶-methyltubercidin exhibits a considerable amount of cytotoxicity against KB cells, as measured in tissue cultures. Solutions containing from 10 to 30 parts per million of N⁶-methyltubercidin are useful in washing instruments and vessels and gloves used in cancer tissue work to destroy any viable cancer cells.

In carrying out the process of the present invention, tubercidin is dissolved in an N,N-dialkylamide in which the alkyl group can have from 1 to 4 carbon atoms, inclusive, and the acyl group of the acid amide is that of a hydrocarbon carboxylic acid containing from 1 to 4 carbon atoms, inclusive.

Particularly useful as solvents are N,N-dimethyl- and N,N-diethylformamide, N,N-dimethyl- and N,N-diethylacetamide, N,N - dipropylacetamide, N,N - dibutylacetamide, N,N - diethylpropionamide, N,N - dimethylbutyramide and the like. To such a solution is then added a methylating agent selected from the group consisting of methyl bromide, methyl iodide, dimethylsulfate and methyl toluene-sulfonate, with methyl iodide preferred. The methylation is conducted at a temperature between 0° and 50° C. with approximately room temperature, between 20 to 30° C., preferred. The reaction time at room temperature is between 12 and 36 hours, and at lower temperatures up to 4 or 5 days can be used. Conversely, at higher temperatures the reaction time can be as short as one hour. The amount of methylating agent used is usually from 1.5 to 4 moles per mole of tubercidin. At the termination of the reaction the product is recovered in conventional manner such as by evaporating the mixture to dryness under reduced pressure. Before further use of the product, the product is generally purified by recrystallization from organic solvents such as methyl alcohol, ethyl alcohol, isopropyl alcohol, tertiary butyl alcohol and the like. However, the material can be used in the next step without purification.

The thus-obtained N¹-methyltubercidin salt is converted to N⁶-methyltubercidin by heating with an aqueous alkaline solution. As such solutions, sodium hydroxide or potassium hydroxide are preferred. The base is used in a concentration between 0.25 to about 5 molar but higher or lower concentrations are also operative. In the preferred embodiment of this invention, a concentration between 0.5 to 1.5 molar is used. The time of reaction depends on the base concentration and, in the preferred embodiment of this invention, is between 10 minutes and 3 hours. After termination of the recation, the desired N⁶-methyltubercidin is obtained by conventional procedures such as evaporation of the solvent and removal of the water-soluble base. N⁶-methyltubercidin can also be recovered by adjusting the pH of the solution so as to cause precipitation of the material.

The following examples are illustrative of the process and product of the present invention, but are not to be construed as limiting.

PREPARATION.—SPARSOMCYIN A
(TUBERCIDIN)

A. Fermentation

A soil slant of *Streptomyces sparsogenes* var. *sparsogenes*, NRRL 2940, was used to inoculate a series of 500-ml. Erlenmeyer flasks, each containing 100 ml. of seed medium consisting of the following ingredients:

| | Grams |
|---|---|
| Glucose monohydrate | 25 |
| Pharmamedia[1] | 25 |
| Tap water, q.s. 1 liter. | |

[1] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operation at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

| | | |
|---|---|---|
| Glucose monohydrate | g./liter | 10 |
| Dextrin | do | 15 |
| Phermamedia | do | 20 |
| Wilson's Peptone Liquor No. 159[1] | do | 5 |
| Lard oil | ml./liter | 2 |
| Tap water | | Balance |

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml. of lard oil was added as an antifoam.

B. Recovery

The whole beer from the above fermentation was adjusted from the harvest pH of 7.1 to pH 2.4 with 350 ml. of sulfuric acid (concentrated) and filtered using 3.6% of diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.) The methanol extracts and washes were combined (11.5 liters) and concentrated in vacuo to a dry preparation weighing 321 g. (HRV–25.3) and assaying 1.25 Proteus vulgaris biounits/mg.

C. Purification

PARTITION COLUMN

Three hundred grams of the above preparation (HRV–25.3) was placed in a partition column which was prepared and developed in the following manner. A solvent system was made using equal volumes (350 liters) of McIlvaine's pH 6.0 buffer and methyl ethyl ketone. A slurry containing 9.6 kg. of diatomite in 60 liters of upper phase and 4.8 liters of lower phase of the above-described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bio-activities observed on P. vulgaris trays. At this point in the process the separation of sparsomycin and sparsomycin A was effectuated. Further processing purified these components and ultimately resulted in crystalline material.

Fractions 24–34, inclusive, from the above partition column contained the sparsomycin component.

PURIFICATION OF SPARSOMYCIN A

The sparsomycin A component was purified and crystallized in the following manner. Fractions 11–20, inclusive, from the previously described partition column—part C—contained the sparsomycin A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA–102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA–105.1 having a melting point of 247.8–250° C., an optical rotation $[\alpha]_D^{25}$ −62° (c.=0.718 in 0.1 N HCl), an equivalent weight of 269, pk a′ of 5.07 in water, an ultraviolet absorption spectrum in

| | | |
|---|---|---|
| Water | 270 m$\mu$, | $a$=44.14 |
| 0.01 N $H_2SO_4$ | 227 m$\mu$, | $a$=85.28 |
| | 271 m$\mu$, | $a$=40.82 |
| 0.01 N KOH | 270 m$\mu$, | $a$=43.50 | a characteristic IR absorption at the following frequencies expressed in reciprocal centimeters

| | | |
|---|---|---|
| 3350 (S) | 1198 (W) | |
| 3250 (S) | 1160 (W) | |
| 3145 (S) | 1134 (M) | |
| 3095 (S) (sh) | 1120 (M) | |
| 2880 (S) (oil) | 1093 (M) | |
| 2810 (S) (oil) | 1080 (W) | |
| 1895 (W) | 1055 (M) | |
| 1640 (S) | 1042 (S) | |
| 1592 (S) | 1017 (S) | |
| 1553 (M) | 992 (S) | |
| 1502 (M) | 953 (W) | |
| 1475 (M) | 912 (W) | |
| 1458 (S) (oil) | 903 (M) | |
| 1445 (M) (sh) | 867 (M) | |
| 1426 (M) | 852 (W) | |
| 1370 (M) (oil) | 842 (W) | |
| 1351 (M) | 799 (W) | |
| 1306 (M) | 715 (W) | |
| 1276 (W) | 704 (S) | |
| 1255 (S) | 675 (M) | |
| 1241 (M) | 658 (M) | | and the following elemental analysis:

*Analysis.*—Calcd. for $C_{11}H_{14}N_4O_4$: C, 49.62; H, 5.30; N, 21.04. Found: C, 49.81; H, 5.20; N, 20.92.

EXAMPLE 1.—$N^1$-METHYLTUBERCIDIN HYDRIODIDE

A mixture of 1 g. of tubercidin, 1 ml. of methyl iodide and 12.5 ml. of N,N-dimethylacetamide was stirred at room temperature for 24 hours. The reaction mixture was diluted with 50 ml. of acetone and refrigerated for a period of 2 days without froming a precipitate. Thereupon the solution was evaporated to dryness under reduced pressure. The resulting solid was twice recrystallized from methanol to give 0.73 g. of $N^1$-methyltubercidin hydriodide having a melting point of 201–207° C. The ultraviolet spectrum had maxima in water at 228 m$\mu$ ($\epsilon$ 37,500) and 274 m$\mu$ ($\epsilon$ 10,200).

*Analysis.*—Calcd. for $C_{12}H_{16}N_4O_4 \cdot HI$: C, 35.31; H, 4.20; N, 13.73; I, 31.10. Found: C, 34.90; H, 4.15; N, 13.06; I, 30.68.

In the manner given in Example 1, tubercidin can be alkylated with methyl bromide in N,N-dimethylformamide to give $N^1$-methyltubercidin hydrobromide.

In the manner given in Example 1, tubercidin can be alkylated with methyl p-toluenesulfonate to give $N^1$-methyltubercidin p-toluenesulfonate.

EXAMPLE 2.—$N^6$-METHYLTUBERCIDIN

A solution of 1.82 g. of $N^1$-methyltubercidin hydriodide in 10 ml. of 1 N sodium hydroxide was heated on a steam bath for 1¼ hours. The solution was cooled, diluted with about 5 ml. of water and adusted to a pH of 7.0 with a 10% aqueous solution of p-toluenesulfonic acid. After a short time at this pH, crystals began to appear. The mixture was then refrigerated and filtered. A crystalline product was obtained weighing 1.15 g. and melting at 168–172° C.

A 0.15 g. portion of this material was dissolved in dilute hydrochloric acid (5.25 ml. of water containing 1.5 ml. of 0.1 N hydrochloric acid), and the solution was neutralized with 1 N sodium hydroxide solution. The crystals which precipitated were recrystallized twice from water to yield 63 mg. of $N^6$-methyltubercidin of melting point 173–176° C. and having $\lambda_{max}$ 276 m$\mu$ ($\epsilon$ 12,300).

*Analysis.*—Calcd. for $C_{12}H_{16}N_4O_4$: C, 51.43; H, 5.76; N, 19.99. Found: C, 51.55; H, 6.02; N, 19.27.

In the manner given in Example 2, $N^1$-methyltubercidin hydrobromide and $N^1$-methyltubercidin p-toluenesulfonate, when heated with an aqueous solution of sodium hydroxide or potassium hydroxide, and the like, are converted to $N^6$-methyltubercidin which can be isolated in the manner disclosed in Example 2.

I claim:
1. A $N^1$-methyltubercidin salt of the formula:

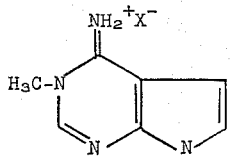

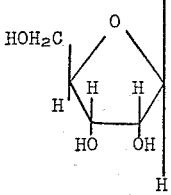

wherein X⁻ is an anion selected from the group consisting of bromide, iodide, monomethylsulfate and p-toluenesulfonate.

2. A process for the production of $N^6$-methyltubercidin which comprises: treating tubercidin with a methyllating agent selected from the group consisting of methyl iodide, methyl bromide, dimethylsulfate and methyl p-toluenesulfonate, in an N,N-dialkylamide wherein the acyl group of the amide is that of a hydrocarbon carboxylic acid containing from 1 to 4 carbon atoms, inclusive, and the alkyl group has from 1 to 4 carbon atoms, inclusive, to obtain the corresponding $N^1$-methyltubercidin salt of the formula:

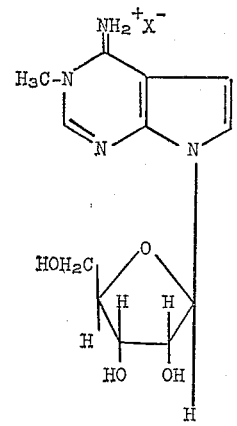

wherein X⁻ is an anion selected from the group consisting of bromide, iodide, monomethylsulfate, and toluenesulfonate, and treating this salt with an alkali-metal hydroxide to obtain $N^6$-methyltubercidin having the formula:

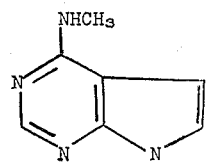

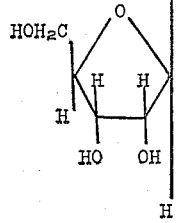

References Cited
UNITED STATES PATENTS
3,167,540  1/1965  Pike et al. _____ 260—211.5

LEWIS GOTTS, *Primary Examiner.*

J. BROWN, *Assistant Examiner.*